(12) United States Patent
Kanhere et al.

(10) Patent No.: US 9,910,646 B2
(45) Date of Patent: Mar. 6, 2018

(54) TECHNOLOGIES FOR NATIVE CODE INVOCATION USING BINARY ANALYSIS

(71) Applicant: Intel Corporation, Santa Clara, CA (US)

(72) Inventors: Abhay S. Kanhere, Fremont, CA (US); Haitao Feng, Beijing (CN); Paul H Hohensee, Nashua, NH (US); Aravind Subramanian, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/998,274

(22) Filed: Dec. 26, 2015

(65) Prior Publication Data

US 2017/0185386 A1  Jun. 29, 2017

(51) Int. Cl.
G06F 9/45 (2006.01)

(52) U.S. Cl.
CPC ............... G06F 8/433 (2013.01); G06F 8/53 (2013.01)

(58) Field of Classification Search
CPC ... G06F 8/42; G06F 8/43; G06F 8/433; G06F 8/52; G06F 8/53
USPC ................................. 717/141–144, 153–157
See application file for complete search history.

(56) References Cited

U.S. PATENT DOCUMENTS

| | | | | |
|---|---|---|---|---|
| 6,226,789 B1 * | 5/2001 | Tye | ............................ | G06F 8/52 717/138 |
| 7,475,394 B2 * | 1/2009 | Calder | ................ | G06F 11/3457 717/158 |
| 8,307,193 B2 * | 11/2012 | Sehr | ..................... | G06F 12/1491 711/163 |
| 8,789,027 B2 * | 7/2014 | Rioux | ..................... | G06F 8/427 717/140 |
| 9,075,625 B1 | 7/2015 | Muth et al. | | |
| 2009/0144698 A1 | 6/2009 | Fanning et al. | | |
| 2011/0047536 A1 | 2/2011 | Santos et al. | | |
| 2012/0102483 A1 | 4/2012 | Goldman | | |
| 2015/0135313 A1 | 5/2015 | Wesie et al. | | |

OTHER PUBLICATIONS

Easton et al., "Cross-Platform .NET Development: Using Mono, Portable.NET, and Microsoft .NET", 2004, Apress, 482 pages.*
Nathan Russell Tallent, "Binary Analysis for Attribution and Interpretation of Performance Measurements on Fully-Optimized Code", May 2007, Master Thesis, Rice University, 107 pages.*
International search report for PCT application No. PCT/US2016/063572, dated Jun. 15, 2017 (3 pages).
Written opinion for PCT application No. PCT/US2016/063572, dated Jun. 15, 2017 (7 pages).

* cited by examiner

Primary Examiner — Ted T Vo
(74) Attorney, Agent, or Firm — Barnes & Thornburg LLP (57) ABSTRACT

Technologies for native code invocation using binary analysis are described. A computing device for invoking native code from managed code using binary analysis receives a call from a thread executing a managed code segment to execute a native code segment. The computing device performs a binary analysis of the native code segment and generates, from the binary analysis, a complexity indicator that indicates a level of complexity of the native code segment by comparing the native code segment to at least one predefined complexity rule. Additionally, the computing device stores a status of the thread based on the complexity indicator and executes the native code segment. Other embodiments are described and claimed.

22 Claims, 6 Drawing Sheets

TECHNOLOGIES FOR NATIVE CODE INVOCATION USING BINARY ANALYSIS

BACKGROUND

Managed runtimes provide methods that enable managed code to interface with unmanaged machine code (e.g., native code). Typical managed runtimes maintain a state for each thread, such as a "running" state and a "native" state. In the "running" state, a thread is actively manipulating managed data in the heap, and periodically the thread checks for suspend requests that enable a garbage collector to reclaim unused memory. Conversely, in the "native" state, a thread does not check for a suspend request.

In typical managed runtimes, the state of a thread is changed when the thread is transitioning from executing managed code to executing native code. Likewise, the state of the thread is changed when the thread is transitioning from executing native code to executing managed code. The change in the state of the thread is performed under a lock and is relatively time consuming. For code segments that pertain to a user interface, key methods are often implemented in native code and invoked from managed code. Accordingly, the locking overhead associated with transitioning from managed code to native code can cause a lag in the responsiveness of the user interface.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
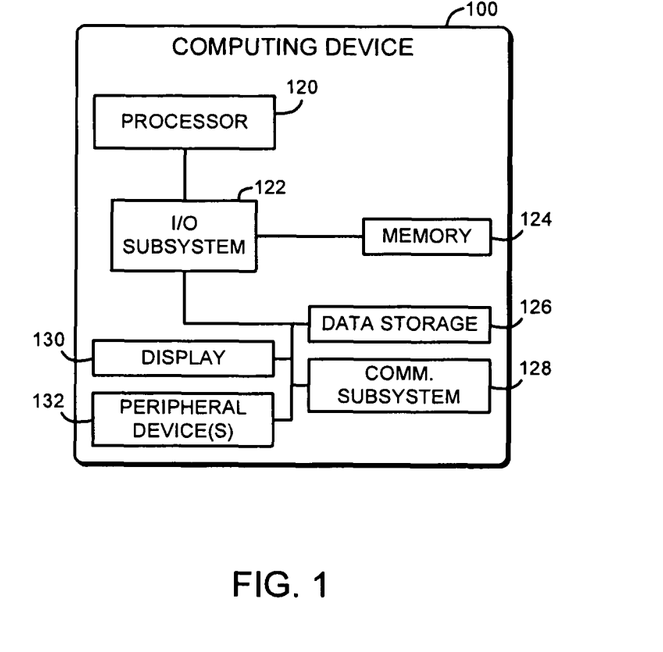
FIG. 1 is a simplified block diagram of at least one embodiment of a computing device for using binary analysis when invoking a native code segment from a managed code segment.

Referring now to FIG. 1, an illustrative computing device 100 for software analysis includes a processor 120, an I/O subsystem 122, a memory 124, and a data storage device 126. In use, as described below, the computing device 100 is configured to perform a binary analysis of a native code segment when a managed code segment invokes the native code segment. For example, the computing device 100 may execute a thread that transitions from a managed code segment to a native code segment. In doing so, the thread may initiate a call from the managed code segment to the native code segment. In response, the computing device 100 performs a binary analysis of the native code segment and generates a complexity indicator that indicates a level of complexity of the native code segment based on the binary analysis. To do so, the computing device 100 may apply predefined complexity rules to the native code segment to determine the level of complexity.

Additionally, the computing device 100 stores a status of the thread, based on the complexity indicator. For example, if the complexity indicator indicates that the native code is of a low level of complexity (e.g., simple), the computing device 100 is configured to maintain the current status of the thread to indicate that the computing device 100 is running managed code, even though the thread is executing the native code. Accordingly, the thread does not undergo a relatively time-consuming state transition when invoking the native code having the low level of complexity. As such, some software elements may be more responsive. For example, user interface elements that are implemented in native code may be more responsive relative to execution by conventional runtimes that transition between managed code and native code. If, on the other hand, the complexity indicator indicates a higher level of complexity (e.g., complex), the computing device 100 is configured to set the status of the thread to indicate that the thread is executing native code.

The computing device 100 may be embodied as any type of device capable of executing managed code segments and native code segments and otherwise performing the functions described herein. For example, the computing device 100 may be embodied as, without limitation, a laptop computer, a notebook computer, a tablet computer, a smartphone, a mobile computing device, a computer, a desktop computer, a workstation, a server computer, a distributed computing system, a multiprocessor system, a consumer electronic device, a smart appliance, and/or any other computing device capable of analyzing software code segments. As shown in FIG. 1, the illustrative computing device 100 includes the processor 120, the I/O subsystem 122, the memory 124, and the data storage device 126. Of course, the computing device 100 may include other or additional components, such as those commonly found in a workstation (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store managed code segments, native code segments, and rules for determining a complexity of the native code segments.

The computing device 100 may also include a communication subsystem 128, which may be embodied as any communication circuit, device, or collection thereof, capable of enabling communications between the computing device 100 and other remote devices over a computer network (not shown). The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

Additionally, the computing device 100 may include a display 130, which may be embodied as any type of display capable of displaying digital information such as a liquid crystal display (LCD), a light emitting diode (LED), a plasma display, a cathode ray tube (CRT), or other type of display device. In some embodiments, the computing device 100 may also include one or more peripheral devices 132. The peripheral devices 132 may include any number of additional input/output devices, interface devices, and/or other peripheral devices.

Figure 2:
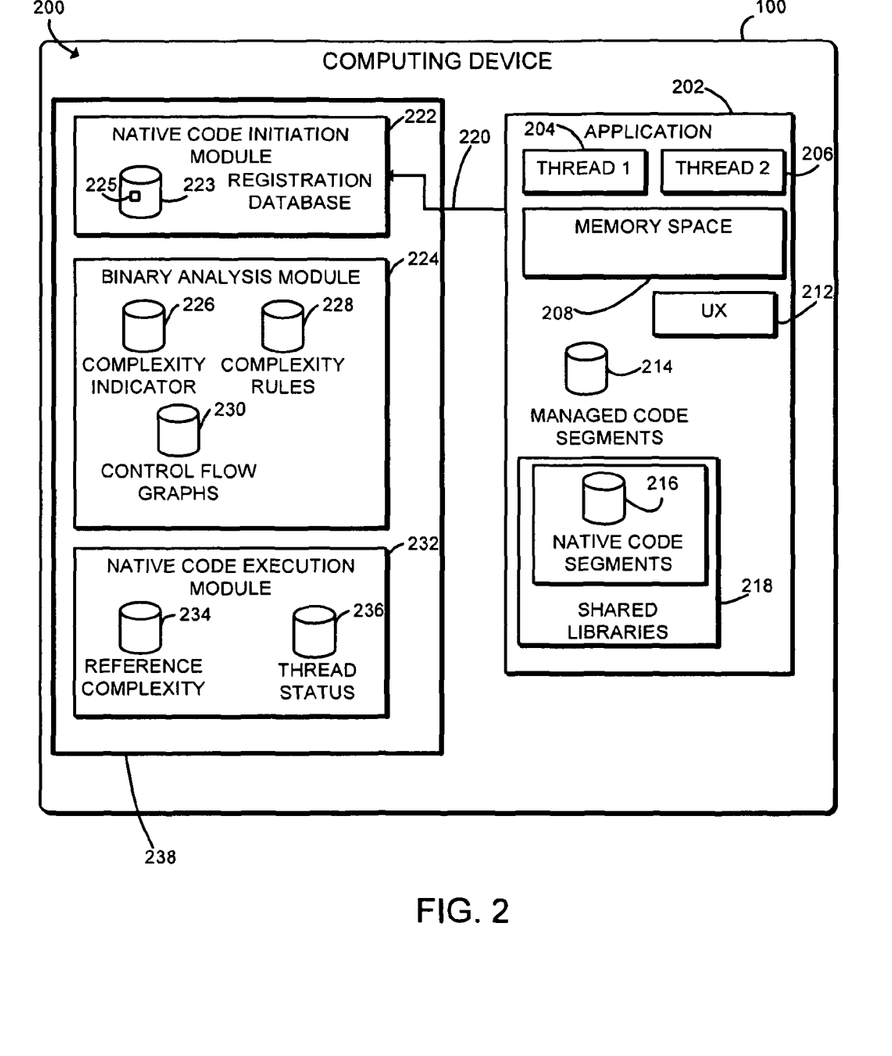
FIG. 2 is a simplified block diagram of at least one embodiment of an environment that may be established by the computing device of FIG. 1.

Referring now to FIG. 2, in the illustrative embodiment, the computing device 100 establishes an environment 200 during operation. The illustrative embodiment 200 includes a native code initiation module 222, a binary analysis module 224, and a native code execution module 232. The various modules of the environment 200 may be embodied as hardware, firmware, software, or a combination thereof. For example, the various modules, logic, and other components of the environment 200 may form a portion of, or otherwise be established by, the processor 120 or other hardware components of the computing device 100. As such, in some embodiments, one or more of the modules of the environment 200 may be embodied as circuitry or collection of electrical devices (e.g., a native code initiation circuit 222, a binary analysis circuit 224, a native code execution circuit 232, etc.). It should be appreciated that, in such embodiments, one or more of the circuits (e.g., the native code initiation circuit 222, the binary analysis circuit 224, the native code execution circuit 232, etc.) may form a portion of one or more of the processor 120, the memory 124, the I/O subsystem 122, and/or the data storage 126. Additionally, in some embodiments, one or more of the illustrative modules may form a portion of another module and/or one or more of the illustrative modules may be independent of one another.

In use, the computing device 100 may execute an application 202, which may include one or more threads. For example, in the illustrative embodiment of FIG. 2, the application 202 includes a first thread 204 and a second thread 206. During execution, the first thread 204 and the second thread 206 may access a memory space 208. The illustrative application 202 also includes managed code segments 214 and native code segments 216. In some embodiments, one or more of the native code segments 216 may be stored inside one or more libraries, for example shared libraries 218. The shared libraries may include, for example, dynamic link libraries ("DLL's") or dynamic shared objects ("DSO's"). The illustrative application 202 also includes a user interface 212 that is at least partially implemented with the native code segments 216, while other portions of the application 202 are implemented with the managed code segments 214. Of course, the application 202 is shown merely for illustrative purposes, and it should be appreciated that other types of applications 202 (e.g., applications having a greater number of threads) may be executed by the computing device 100 using the technologies described herein.

The native code initiation module 222 is configured to receive a call 220 from a thread, for example the first thread 204 executing the managed code segment 214 to execute one of the native code segments 216. In response, the native code initiation module 222 is configured to load the native code segment 216, for example by loading the associated shared library 218. Additionally, the native code initiation module 222 is configured to determine whether the native code segment 216 has previously been registered. For example, the native code initiation module 222 may determine whether a flag 225 has been stored in a registration database 223 that indicates the native code segment 216 has previously been analyzed and executed by computing device 100. If the native code segment 216 has not been registered, the native code initiation module 222 transmits the code to the binary analysis module 224 and stores a flag 225 in the registration database 223, which indicates that the native code segment 216 has been registered. If, on the other hand, the native code segment 216 has already been registered, the native code initiation module 222 transmits the native code segment 216 directly to the native code execution module 232.

The binary analysis module 224 is configured to perform a binary analysis of the native code segment 216 to determine a level of complexity of the native code segment 216. To do so, the binary analysis module 224 may map the native code segment 216 to the memory space 208 prior to analyzing the native code segment 216. Further, the binary analysis module 224 is configured to generate, based on the binary analysis, a complexity indicator 226 that indicates a level of complexity of the native code segment 216. For example, the complexity indicator 226 may be embodied as a numeric value indicative of the level of complexity and/or qualities related thereto. The determined level of complexity of the native code segment 216 may be based on various qualities of the native code segment 216 that are indicative of complex code including, but not limited to the number of instructions, loops, and/or indirect control flows included in the native code segment 216. As such, in the illustrative embodiment, the complexity indicator 226 may be indicative of the number of instructions in the native code segment 216, the number of loops in the native code segment 216, and/or the number of indirect control flows in the native code segment 216. In some embodiments, the binary analysis module 224 may determine the value of the complexity indicator 226 by comparing the native code segment 216 to one or more predefined complexity rules 228, as described in more detail below. Additionally, in performing the binary analysis, the binary analysis module 224 may be configured to generate one or more control flow graphs 230 that define possible execution paths through the native code segment 216. The generation of the control flow graphs 230 by the binary analysis module 224 is described in more detail below.

The native code execution module 232 is configured to store a status 236 of the corresponding thread (e.g., first thread 204) based on the complexity indicator 226, and execute the native code segment 216 in the corresponding thread (e.g., first thread 204). For example, the native code execution module 232 may receive the complexity indicator 226 from the native code execution module 232 and compare the complexity indicator 226 to a predefined reference complexity 234. If the complexity indicator 226 satisfies the predefined reference complexity 234 (e.g., if the complexity indicator 226 is less than or equal to the predefined reference complexity 234), the native code execution module 232 sets the thread status 236 to indicate that the corresponding thread (e.g., first thread 204) is executing managed code. In some embodiments, the thread status 236 may be already set to indicate that the first thread 204 is executing managed code, and native code execution module 232 simply maintains the thread status 236 at the present setting. By contrast, if the complexity indicator 226 does not satisfy the predefined reference complexity 234 (e.g., if the complexity indicator 226 is greater than the predefined reference complexity 234), the native code execution module 232 is configured to initiate a lock on the native code segment 216 and change the thread status 236 to indicate that the thread is executing native code. Additionally, when the first thread 204 has completed executing the native code segment 216, the native code execution module 232 is configured to initiate a second lock and change the thread status 236 to indicate that the first thread 204 is executing managed code.

Figure 3:
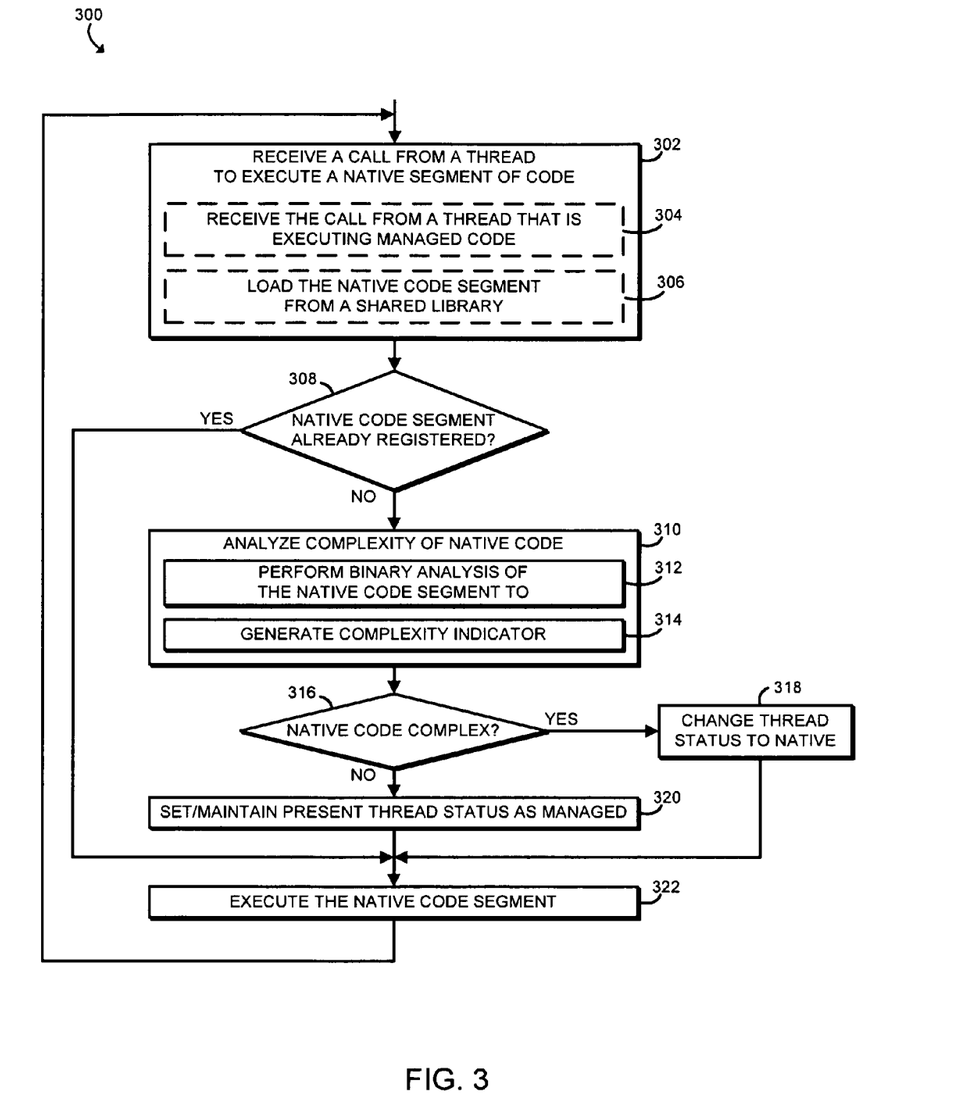
FIG. 3 is a simplified flow diagram of at least one embodiment of a method for using binary analysis when invoking a native code segment from a managed code segment that may be executed by the computing device of FIGS. 1 and 2.

Referring now to FIG. 3, in use, the computing device 100 may execute a method 300 for invoking native code (e.g., the native code segment 216) from managed code (e.g., the managed code segment 214) using binary analysis. The method 300 begins in block 302, in which the native code initiation module 222 of computing device 100 receives a call (e.g., call 220) from a thread (e.g., the first thread 204), to execute a native segment of code (e.g., the native code segment 216). As indicated in block 304, in some embodiments, the calling thread may be executing managed code, for example managed code segment 214, when the native code initiation module 222 receives the call 220 to execute the native code segment 216. As indicated in block 306, in some embodiments, the computing device 100 may load the native code segment 216 from a shared library, for example shared library 218. In block 308, the computing device 100 determines whether the native code segment 216 has already been registered. For example, in some embodiments, the computing device 100 may determine whether registration database 223 includes an indicator or flag 225 indicating that the native code segment 216 is registered.

If the native code segment 216 is already registered, the method 300 advances to block 322 in which the computing device 100 foregoes performing a binary analysis of the native code segment 216 and instead executes the native code segment 216. If, on the other hand, the computing device 100 determines that the native code segment 216 has not already been registered in block 308, the method 300 advances to block 310. In block 310, the computing device 100 analyzes the complexity of the native code segment 216. For example, in the illustrative embodiment, the computing device 100 performs a binary analysis of the native code segment 216 in block 312. To do so, the computing device 100 may utilize any suitable methodology to perform the binary analysis on the native code segment 216. An illustrative method for performing a binary analysis that may be performed in block 312 is described below in regard to method 400 of FIG. 4.

In block 314, the computing device 100 may also generate a complexity indicator (e.g., the complexity indicator 226) that provides an indication of the level of complexity of the native code segment 216 based on the complexity analysis. Again, the computing device 100 may utilize any suitable methodology to generate a complexity indicator. An illustrative method for generating a complexity indicator that may be performed in block 314 is described below in regard to method 500 of FIG. 5.

In some embodiments, rather than performing block 310 in response to receiving a call from a thread executing managed code, the computing device 100 (e.g., the native code initiation module 222) loads the native code ahead of time and performs the binary analysis of block 312 ahead of time. For example, the computing device may load the native code and perform the binary analysis on the native code during an ahead of time compilation. In such embodiments, when the native code initiation module 222 receives the call from the thread 204, the computing device 100 confirms that the native code (e.g., shared library) to be executed is the same native code that was previously analyzed in the ahead of time compilation, for example by comparing a hash of the native code from the ahead of time compilation to a hash of the native code to be executed by the calling thread 204.

After the computing device 100 has analyzed the native code in block 310, the method 300 advances to block 316. In block 316, the computing device 100 determines whether the complexity indicator 226 indicates a low level of complexity. To do so, for example, the computing device may compare the complexity indicator 226 determined in block 314 to the predefined reference complexity 234. If the complexity indicator 226 satisfies the predefined reference complexity 234 (e.g., is less than or equal to), the computing device 100 may determine that complexity indicator 226 indicates a low level of complexity (e.g., simple). However, if the complexity indicator 226 does not satisfy the predefined reference complexity 234 (e.g., is greater than), the computing device 100 may determine that the complexity indicator 226 indicates a higher level of complexity (e.g., complex).

If, in block 316, the complexity indicator 226 indicates that the native code is complex, the method 300 advances to block 318 in which the computing device 100 changes the thread status 236 to indicate the code segment is native code. The method 300 subsequently advances to block 322 in which the computing device 100 executes the native code segment.

If, however, the complexity indicator 226 indicates that the native code is not complex in block 316, the method 300 advances to block 320. In block 320, the computing device 100 sets or maintains the thread status 236 to indicate that the code segment is managed code (even though the code segment is, in fact, native code). By avoiding transitioning the thread status 236 from an indication of managed code to an indication of native code, the computing device 100 prevents a lock from being placed on the native code segment 216 that may otherwise incur noticeable delays in the processing of the native code segment 216. For example, in embodiments in which the native code segment 216 controls functionality of the user interface 212, preventing the thread status 236 from transitioning from an indication of managed code execution to an indication of native code execution may increase the responsiveness of the user interface to user interactions and avoid the time-consuming lock that would otherwise be performed to change the thread status 236.

After the thread status 236 has been changed in block 318 or set/maintained in block 320, the method 300 advances to block 322. In block 322, the computing device 100 executes the native code segment. The method 300 may subsequently loop back to block 300 in which the native code initiation module 222 of computing device 100 may receive another call from a thread to execute a native segment of code.

Figure 4:
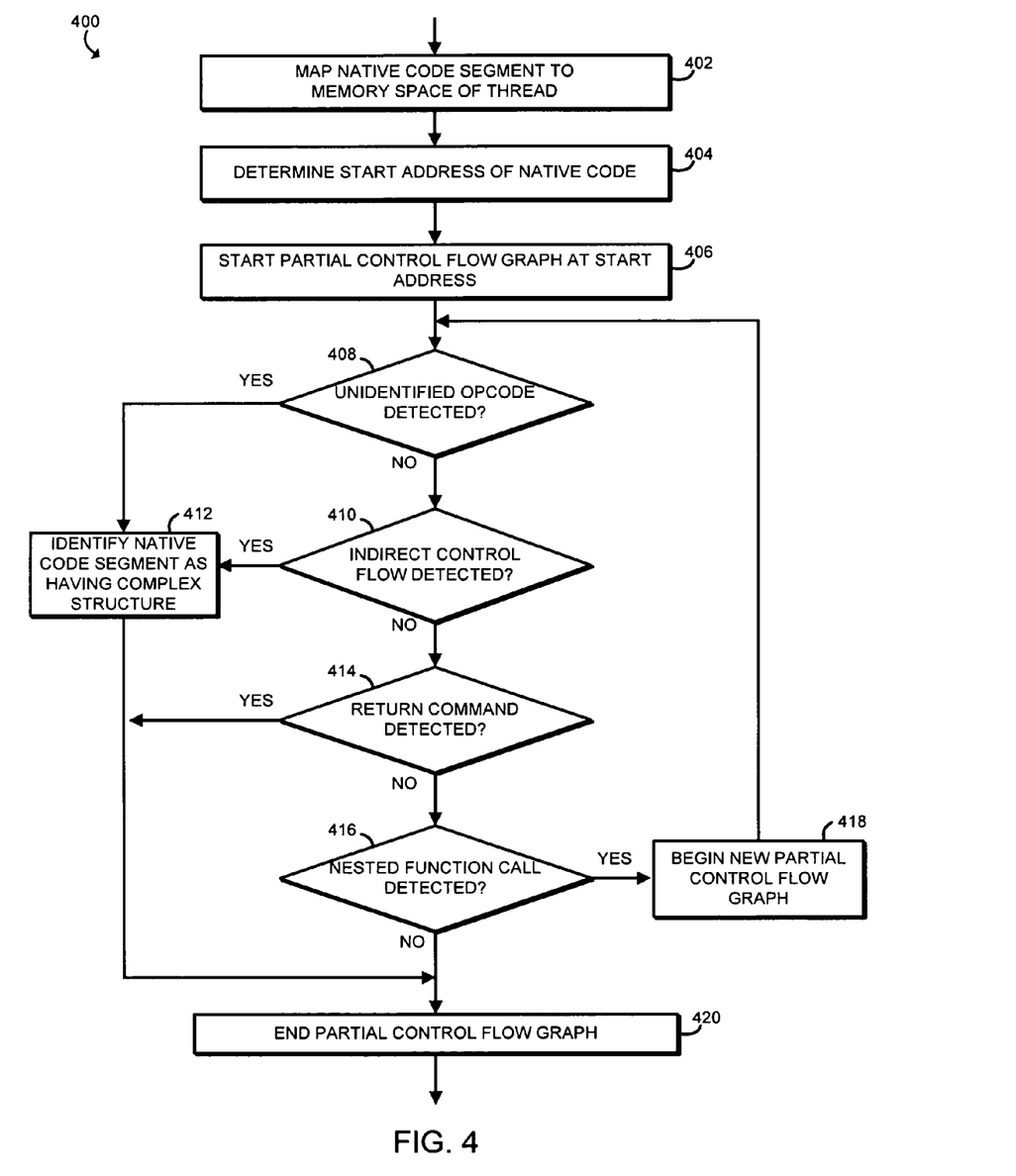
FIG. 4 is a simplified flow diagram of a method for binary analysis that may be executed by the computing device of FIGS. 1 and 2.

Referring now to FIG. 4, as discussed above, the computing device 100 may execute a method 400 to perform a binary analysis on the native code during operation (e.g., in block 312 of method 300 of FIG. 3). The method 400 begins with block 402 in which the computing device 100 maps the native code segment 216 to the memory space 208 of the first thread 204. Subsequently, in block 404, the computing device 100 determines a start address (e.g., start address 602 shown in FIG. 6) of the native code segment 216 in the memory space 208. In block 406, the computing device 100 starts a partial control graph (e.g., one of control flow graphs 230) at the start address.

Subsequently, in block 408, the computing device 100 determines whether an unidentified opcode (e.g., an unidentified opcode 604 in FIG. 6) has been detected in the native code segment 216. If so, the method 400 advances to block 412 in which the computing device 100 identifies the particular code segment as having a complex structure (i.e., the unidentified op code). The method 400 subsequently advances to block 420 in which the computing device 100 ends the present partial control flow graph.

Referring back to block 408, if the computing device 100 does not detect any unidentified opcode 604 in the native code segment 216, the method 400 advances to block 410. In block 410, the computing device 100 determines whether an indirect control flow (e.g., indirect control flow 612 in FIG. 6) has been detected in the native code segment 216. If so, the method 400 advances to block 412 in which the computing device 100 identifies the particular code segment as having a complex structure (i.e., the indirect control flow). The method 400 subsequently advances to block 420 in which the computing device 100 ends the present partial control flow graph.

Referring back to block 410, if the computing device 100 does not detect any indirect control flow, the method 400 advances to block 414. In block 414, the computing device 100 determines whether a return command (e.g., return command 608 in FIG. 6) has been detected in the native code segment 216. If so, the method 400 advances to block 420 in which the computing device 100 ends the present partial control flow graph.

Referring back to block 414, if the computing device 100 does not detect a return command 608, the method 400 advances to block 416. In block 416, the computing device 100 determines whether a nested function call (e.g., nested function call 610 in FIG. 6) has been detected in the native code segment 216. If so, the method 400 advances to block 418 in which the computing device 100 initiates a new partial control flow graph, and the method loops back to block 408 to begin analysis of the new partial control flow graph in blocks 408-416 as discussed above. If, however, the computing device 100 has not detected a nested function call 610 in the native code segment 216, the method 400 advances to block 420 in which the computing device 100 ends the present partial control flow graph.

Figure 5:
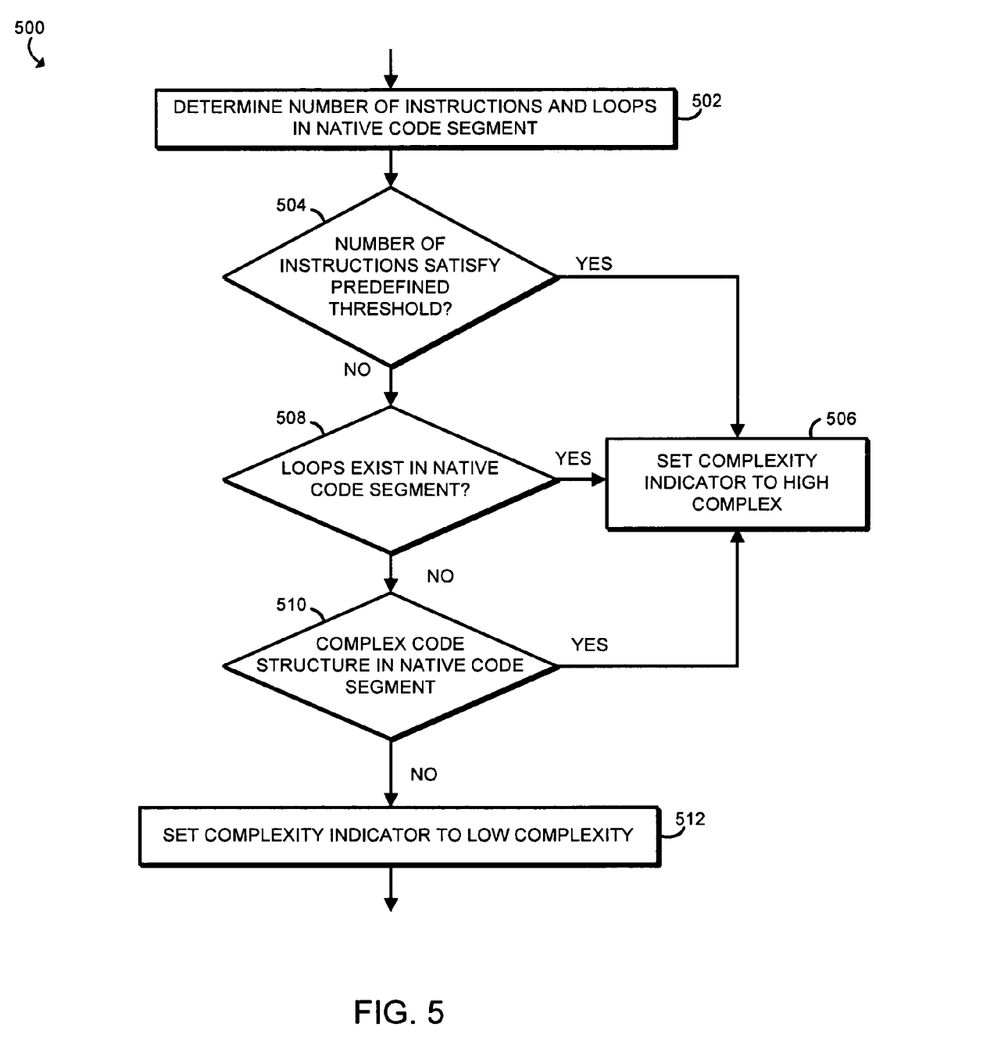
FIG. 5 is a simplified flow diagram of a method for generating a complexity indicator that may be executed by the computing device of FIGS. 1 and 2.

Referring now to FIG. 5, as discussed above, the computing device 100 may generate a complexity indicator to indicate the level of complexity of native code segment 216 during operation (e.g., in block 314 of method 300 of FIG. 3). The method 500 begins with block 502 in which the computing device 100 determines a number of instructions 600 and a number of loops 606 that are present in the native code segment 216. To do so, the computing device 100 may analyze, for example, the control flow graphs 230 generated via the method 400 of FIG. 4. Subsequently, in block 504, the computing device 100 determines whether the number of instructions 600 in the native code segment 216 satisfies the predefined threshold number of instructions 700. For example, the computing device 100 may determine whether the number of instructions 600 is greater than (or equal to or greater than) the predefined threshold number of instructions 700. The predefine threshold number of instructions 700 may be stored in, for example, the complexity rules 228. If the number of instructions 600 satisfies the predefined threshold number of instructions 700, the method 500 advances to block 506 in which the computing device 100 sets the complexity indicator 226 to indicate a higher level of complexity (e.g., complex).

If, however, the number of instructions 600 does not satisfy the predefined threshold number of instructions 700, the method 500 advances to block 508 in which the computing device 100 determines whether loops 606 exist in the native code segment 216. To do so, in some embodiments, the computing device 100 may determine whether the number of loops 606 determined in block 502 satisfies a predefined threshold number of loops. In other embodiments, the computing device 100 may determine that loops 606 exist in the native code segment 216 if at least one loop is present. Regardless, if the computing device 100 determines that loops exist in the native code segment 216, the method 500 advances to block 506 in which the computing device 100 sets the complexity indicator 226 to indicate a higher level of complexity (e.g., complex).

If, however, the computing device 100 determines that loops 606 do not exist in the native code segment 216, the method 500 advances to block 510. In block 510, the computing device determines whether any complex code structure is present in the native code segment 216 as determined via the method 400 discussed above. For example, the computing device 100 may determine whether any unidentified opcode and/or indirect control flows were detected in the native code segment 216. If so, the method 500 advances to block 506 in which the computing device 100 sets the complexity indicator 226 to indicate a higher level of complexity (e.g., complex). If, however, no complex structure was detected in the native code segment 216, the method 500 advances to block 512 in which the computing device 100 sets the complexity indicator 226 to indicate a lower level of complexity (e.g., simple).

Figure 6:
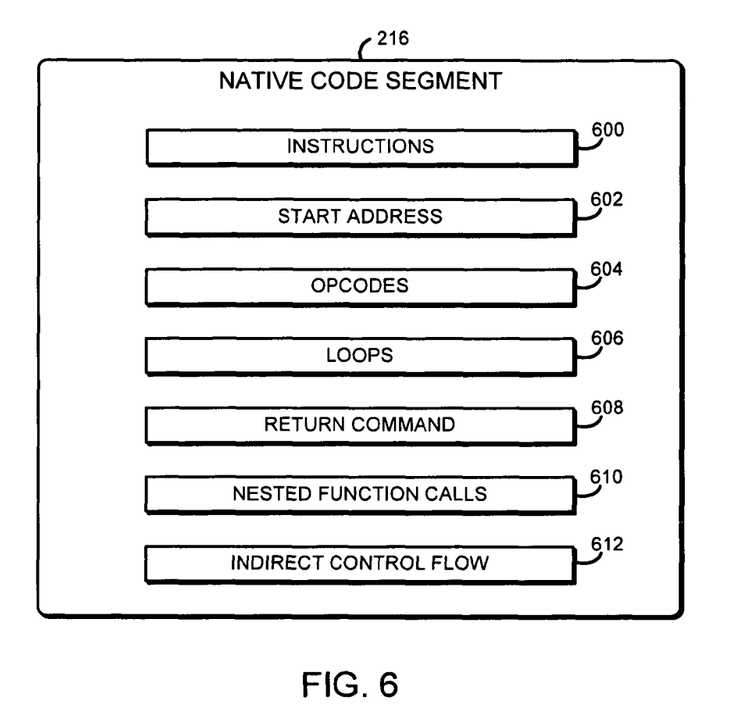
FIG. 6 is a simplified block diagram of components of a native code segment that may be executed by the computing device of FIGS. 1 and 2.

Referring now to FIG. 6, a simplified block diagram of components of the native code segment 216 that may be executed by the computing device 100 is shown. The illustrative native code segment 216 includes instructions 600, which may be embodied as binary instructions such as object code or machine code, rather than byte code. Additionally, the native code segment 216 illustratively includes a start address 602, for example a memory address that indicates a location of the first instruction of a function in the native code segment 216. More specifically, in some embodiments, the call 220 described with reference to FIG. 2 may be embodied as a call to execute a function that begins at the start address 602. The illustrative native code segment 216 may additionally include opcodes 604 that specify operations to be performed by computing device 100. Additionally, in at least some embodiments, the native code segment 216 may include one or more loops 606. Further, in some embodiments, the native code segment 216 may include a return command 608 that returns the thread of execution (e.g., first thread 204) to a calling function. Additionally, in some embodiments, the illustrative native code segment 216 may include one or more nested function calls 610. That is, one function defined in the native code segment 216 may call another function using a nested function call 610. Further, the illustrative native code segment 216 may include indirect control flows 612, which are embodied as program control instructions that specify a location in memory that contains the address of the next instruction to be executed.

Figure 7:
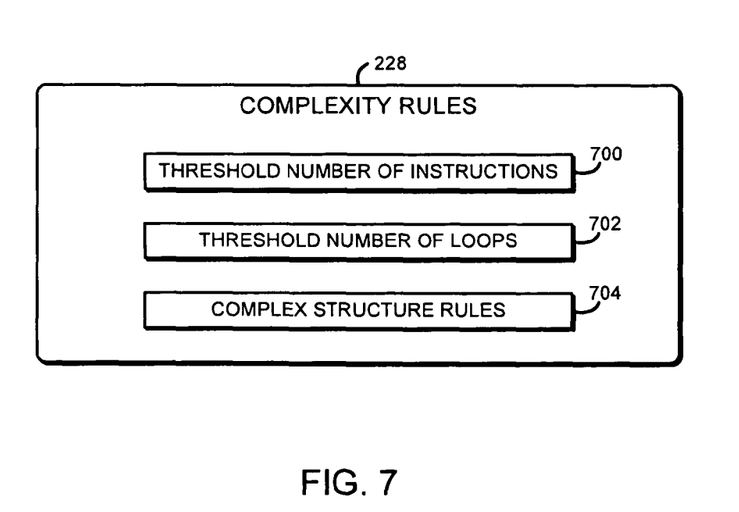
FIG. 7 is a simplified block diagram of complexity rules that may be applied by the computing device of FIGS. 1 and 2 to generate a complexity indicator.

Referring now to FIG. 7, a simplified block diagram of an embodiment of the complexity rules 228 that may be applied by the computing device 100 to generate the complexity indicator 226 is shown. The illustrative complexity rules 228 include a predefined threshold number of instructions 700. For example, as described above with reference to FIG. 5, the computing device 100 may compare the number of instructions 600 in the native code segment 216 to the threshold number of instructions 700 to determine whether the native code segment 216 is complex. Further, the illustrative complexity rules 228 may include a threshold number of loops 702. In some embodiments, as discussed above, the threshold number of loops 702 may be defined as one. Accordingly, in such embodiments, if the computing device 100 detects a single loop 606 in the native code segment 216, the computing device 100 determines that the native code segment 216 has a higher level of complexity (e.g., complex). Of course, in other embodiments, the threshold number of loops 702 may be greater than one. Additionally, the illustrative complexity rules 228 may include complex structure rules 704. For example, the complex structure rules 704 may be embodied as rules that indicate the native code segment 216 should be considered complex if the computing device detects a complex structure in the native code segment 216 (e.g., an indirect control flow 612 or an unidentified opcode 604) in the native code segment 216.

EXAMPLES

Illustrative examples of the technologies disclosed herein are provided below. An embodiment of the technologies may include any one or more, and any combination of, the examples described below.

Example 1 includes a computing device for invoking native code from managed code using binary analysis, the computing device comprising a native code initiation module to receive a call to execute a native code segment from a thread configured to execute a managed code segment; a binary analysis module to (i) perform a binary analysis of the native code segment and (ii) determine a level of complexity of the native code segment based the binary analysis; and a native code execution module to determine of a status of the thread based on the determined level of complexity and execute the native code segment based on the status of the thread, wherein the status of the thread indicates whether the native code segment is to be executed as a native or a managed code segment.

Example 2 includes the subject matter of Example 1, and wherein the native code initiation module is further to determine whether the native code segment requires registration; and transmit the native code segment to the binary analysis module in response to a determination that the native code segment requires registration.

Example 3 includes the subject matter of any of Examples 1 and 2, and wherein the native code initiation module is further to load the native code segment from a shared library.

Example 4 includes the subject matter of any of Examples 1-3, and wherein the binary analysis module is further to map the native code segment to a memory space associated with the thread.

Example 5 includes the subject matter of any of Examples 1-4, and wherein the binary analysis module is further to determine a number of instructions in the native code segment; and determine whether the number of instructions satisfies a predefined threshold number of instructions; wherein to determine the level of complexity of the native code segment comprises to (i) determine the native code segment has a high level of complexity in response to a determination that the number of instructions satisfies the predefined threshold number of instructions and (ii) determine the native code segment has a low level of complexity in response to a determination that the number of instructions does not satisfy the predefined threshold number of instructions.

Example 6 includes the subject matter of any of Examples 1-5, and wherein the binary analysis module is further to determine whether loops exist within the native code segment; wherein to determine the level of complexity of the native code segment comprises to (i) determine the native code segment has a high level of complexity in response to a determination that loops exist within the native code segment and (ii) determine the native code segment has a low level of complexity in response to a determination that loops do not exist within the native code segment.

Example 7 includes the subject matter of any of Examples 1-6, and wherein the binary analysis module is further to determine whether at least one of an indirect control flow and an unidentified opcode exists in the native code segment; wherein to determine the level of complexity of the native code segment comprises to (i) determine the native code segment has a high level of complexity in response to a determination that at least one of an indirect control flow and an unidentified opcode exists in the native code segment and (ii) determine the native code segment has a low level of complexity in response to a determination that neither of an indirect control flow and an unidentified opcode exists in the native code segment.

Example 8 includes the subject matter of any of Examples 1-7, and wherein the binary analysis module is further to generate a complexity indicator that indicates the determined level of complexity.

Example 9 includes the subject matter of any of Examples 1-8, and wherein the native code execution module is further to identify whether the complexity indicator indicates a low level of complexity or a high level of complexity; maintain, in response to a determination that the complexity indicator indicates a low level of complexity, the status of the thread to indicate that the native code segment is to be executed as managed code; set, in response to a determination that the complexity indicator indicates a high level of complexity, the status of the thread to indicate that the native code segment is to be executed as native code.

Example 10 includes the subject matter of any of Examples 1-9, and wherein the complexity indicator is stored in association with the native code segment and the native code initiation module is further to retrieve the complexity indicator; retrieve a first hash stored in association with the native code segment; and compare the first hash to a second hash associated with the native code segment, in response to the call to execute the native code segment, to determine whether the native code segment has changed since the complexity indicator was stored.

Example 11 includes the subject matter of any of Examples 1-10, and wherein the binary analysis module is further to determine a start address of the native code segment; and generate at least a partial control flow graph that starts with a native instruction located at the start address of the native code segment.

Example 12 includes the subject matter of any of Examples 1-11, and wherein the binary analysis module is further to detect whether a return command is present in the native code segment; and end the partial control flow graph in response to a detection of a return command in the native code segment.

Example 13 includes the subject matter of any of Examples 1-12, and wherein the binary analysis module is further to detect whether an unidentified opcode is present in the native code segment; and end the partial control flow graph in response to a detection of an unidentified opcode in the native code segment.

Example 14 includes the subject matter of any of Examples 1-13, and wherein the binary analysis module is further to detect whether an indirect control flow is present in the native code segment; and end the partial control flow graph in response to a detection of an indirect control flow in the native code segment.

Example 15 includes the subject matter of any of Examples 1-14, and wherein the partial control flow graph is a first partial control flow graph, the binary analysis module is further to detect whether a nested function call is present in the native code segment; and generate a second partial control flow graph based on a nested function call, in response to a detection of the nested function call in the native code segment.

Example 16 includes the subject matter of any of Examples 1-15, and wherein the binary analysis module is further to perform the binary analysis of the native code segment during an ahead of time compilation process.

Example 17 includes a method for invoking native code from managed code using binary analysis, the method comprising receiving, by a computing device, a call to execute a native code segment from a thread configured to execute a managed code segment; performing, by the computing device, a binary analysis of the native code segment; determining, by the computing device, a level of complexity of the native code segment based the binary analysis; determining, by the computing device, a status of the thread based on the determined level of complexity; and executing, by the computing device, the native code segment based on the status of the thread, wherein the status of the thread indicates whether the native code segment is to be executed as a native or a managed code segment.

Example 18 includes the subject matter of Example 17, and further including determining, by the computing device, whether the native code segment requires registration; and performing, by the computing device, the binary analysis in response to a determination that the native code segment requires registration.

Example 19 includes the subject matter of any of Examples 17 and 18, and further including loading, by the computing device, the native code segment from a shared library.

Example 20 includes the subject matter of any of Examples 17-19, and further including mapping, by the computing device, the native code segment to a memory space associated with the thread.

Example 21 includes the subject matter of any of Examples 17-20, and further including determining, by the computing device, a number of instructions in the native code segment; and determining, by the computing device, whether the number of instructions satisfies a predefined threshold number of instructions; and wherein determining the level of complexity of the native code segment comprises (i) determining the native code segment has a high level of complexity in response to a determination that the number of instructions satisfies the predefined threshold number of instructions and (ii) determining the native code segment has a low level of complexity in response to a determination that the number of instructions does not satisfy the predefined threshold number of instructions.

Example 22 includes the subject matter of any of Examples 17-21, and further including determining, by the computing device, whether loops exist within the native code segment; and wherein determining the level of complexity of the native code segment comprises (i) determining the native code segment has a high level of complexity in response to a determination that loops exist within the native code segment and (ii) determining the native code segment has a low level of complexity in response to a determination that loops do not exist within the native code segment.

Example 23 includes the subject matter of any of Examples 17-22, and further including determining, by the computing device, whether at least one of an indirect control flow and an unidentified opcode exists in the native code segment; and wherein determining the level of complexity of the native code segment comprises (i) determining the native code segment has a high level of complexity in response to a determination that at least one of an indirect control flow and an unidentified opcode exists in the native code segment and (ii) determining the native code segment has a low level of complexity in response to a determination that neither of an indirect control flow and an unidentified opcode exists in the native code segment.

Example 24 includes the subject matter of any of Examples 17-23, and further including generating, by the computing device, a complexity indicator that indicates the determined level of complexity.

Example 25 includes the subject matter of any of Examples 17-24, and further including identifying, by the computing device, whether the complexity indicator indicates a low level of complexity or a high level of complexity; and determining the status of the thread further comprises (i) maintaining the status of the thread to indicate that the native code segment is to be executed as managed code, in response to a determination that the complexity indicator indicates a low level of complexity and (ii) setting the status of the thread to indicate that the native code segment is to be executed as native code, in response to a determination that the complexity indicator indicates a high level of complexity.

Example 26 includes the subject matter of any of Examples 17-25, and wherein the complexity indicator is stored in association with the native code segment, the method further comprising retrieving, by the computing device, the complexity indicator; retrieving, by the computing device, a first hash stored in association with the native code segment; and comparing, by the computing device, the first hash to a second hash associated with the native code segment, in response to the call to execute the native code segment, to determine whether the native code segment has changed since the complexity indicator was stored.

Example 27 includes the subject matter of any of Examples 17-26, and further including determining, by the computing device, a start address of the native code segment; and generating, by the computing device, at least a partial control flow graph that starts with a native instruction located at the start address of the native code segment.

Example 28 includes the subject matter of any of Examples 17-27, and further including detecting, by the computing device, whether a return command is present in the native code segment; and ending, by the computing device, the partial control flow graph in response to a detection of a return command in the native code segment.

Example 29 includes the subject matter of any of Examples 17-28, and further including detecting, by the computing device, whether an unidentified opcode is present in the native code segment; and ending, by the computing device, the partial control flow graph in response to a detection of an unidentified opcode in the native code segment.

Example 30 includes the subject matter of any of Examples 17-29, and further including detecting, by the computing device, whether an indirect control flow is present in the native code segment; and ending, by the computing device, the partial control flow graph in response to a detection of an indirect control flow in the native code segment.

Example 31 includes the subject matter of any of Examples 17-30, and wherein the partial control flow graph is a first partial control flow graph, the method further comprising detecting, by the computing device, whether a nested function call is present in the native code segment; and generating, by the computing device, a second partial control flow graph based on a nested function call, in response to a detection of the nested function call in the native code segment.

Example 32 includes the subject matter of any of Examples 17-31, and wherein performing the binary analysis further comprises performing the binary analysis of the native code segment during an ahead of time compilation process.

Example 33 includes one or more computer-readable storage media comprising a plurality of instructions that, when executed, cause a computing device to perform the method of any of Examples 17-32.

Example 34 includes a computing device for invoking native code from managed code using binary analysis, the computing device comprising means for receiving a call to execute a native code segment from a thread configured to execute a managed code segment; means for performing a binary analysis of the native code segment; means for determining a level of complexity of the native code segment based the binary analysis; means for determining a status of the thread based on the determined level of complexity; means for executing the native code segment based on the status of the thread, wherein the status of the thread indicates whether the native code segment is to be executed as a native or a managed code segment.

Example 35 includes the subject matter of Example 34, and further including means for determining whether the native code segment requires registration; and means for performing the binary analysis in response to a determination that the native code segment requires registration.

Example 36 includes the subject matter of any of Examples 34 and 35, and further including means for loading the native code segment from a shared library.

Example 37 includes the subject matter of any of Examples 34-36, and further including means for mapping the native code segment to a memory space associated with the thread.

Example 38 includes the subject matter of any of Examples 34-37, and further including means for determining a number of instructions in the native code segment; and means for determining whether the number of instructions satisfies a predefined threshold number of instructions, and wherein the means for determining the level of complexity of the native code segment comprises means for determining the native code segment has a high level of complexity in response to a determination that the number of instructions satisfies the predefined threshold number of instructions; and means for determining the native code segment has a low level of complexity in response to a determination that the number of instructions does not satisfy the predefined threshold number of instructions.

Example 39 includes the subject matter of any of Examples 34-38, and further including means for determining whether loops exist within the native code segment; and wherein the means for determining the level of complexity of the native code segment comprises means for determining the native code segment has a high level of complexity in response to a determination that loops exist within the native code segment; and means for determining the native code segment has a low level of complexity in response to a determination that loops do not exist within the native code segment.

Example 40 includes the subject matter of any of Examples 34-39, and further including means for determining whether at least one of an indirect control flow and an unidentified opcode exists in the native code segment; and wherein the means for determining the level of complexity of the native code segment comprises means for determining the native code segment has a high level of complexity in response to a determination that at least one of an indirect control flow and an unidentified opcode exists in the native code segment; and means for determining the native code segment has a low level of complexity in response to a determination that neither of an indirect control flow and an unidentified opcode exists in the native code segment.

Example 41 includes the subject matter of any of Examples 34-40, and further including means for generating a complexity indicator that indicates the determined level of complexity.

Example 42 includes the subject matter of any of Examples 34-41, and further including means for identifying whether the complexity indicator indicates a low level of complexity or a high level of complexity; and wherein the means for determining the status of the thread further comprises means for maintaining the status of the thread to indicate that the native code segment is to be executed as managed code, in response to a determination that the complexity indicator indicates a low level of complexity; and means for setting the status of the thread to indicate that the native code segment is to be executed as native code, in response to a determination that the complexity indicator indicates a high level of complexity.

Example 43 includes the subject matter of any of Examples 34-42, and wherein the complexity indicator is stored in association with the native code segment, the computing device further comprising means for retrieving the complexity indicator; means for retrieving a first hash stored in association with the native code segment; and means for comparing the first hash to a second hash associated with the native code segment, in response to the call to execute the native code segment, to determine whether the native code segment has changed since the complexity indicator was stored.

Example 44 includes the subject matter of any of Examples 34-43, and further including means for determining a start address of the native code segment; and means for generating at least a partial control flow graph that starts with a native instruction located at the start address of the native code segment.

Example 45 includes the subject matter of any of Examples 34-44, and further including means for detecting whether a return command is present in the native code segment; and means for ending the partial control flow graph in response to a detection of a return command in the native code segment.

Example 46 includes the subject matter of any of Examples 34-45, and further including means for detecting whether an unidentified opcode is present in the native code segment; and means for ending the partial control flow graph in response to a detection of an unidentified opcode in the native code segment.

Example 47 includes the subject matter of any of Examples 34-46, and further including means for detecting whether an indirect control flow is present in the native code segment; and means for ending the partial control flow graph in response to a detection of an indirect control flow in the native code segment.

Example 48 includes the subject matter of any of Examples 34-47, and wherein the partial control flow graph is a first partial control flow graph, the computing device further comprising means for detecting whether a nested function call is present in the native code segment; and means for generating a second partial control flow graph based on a nested function call, in response to a detection of the nested function call in the native code segment.

Example 49 includes the subject matter of any of Examples 34-48, and wherein the means for performing the binary analysis comprises means for performing the binary analysis of the native code segment during an ahead of time compilation process.

The invention claimed is:

1. A computing device for invoking native code from managed code using binary analysis, the computing device comprising:
a memory;
a processor coupled to the memory;
a native code initiation module to receive a call to execute a native code segment from a thread configured to execute a managed code segment;
a binary analysis module to perform a binary analysis of the native code segment to determine a number of instructions in the native code segment, determine whether the number of instructions satisfies a predefined threshold number of instructions, determine, in response to a determination that the number of instructions satisfies the predefined threshold number of instructions, that the native code segment has a high level of complexity, and determine, in response to a determination that the number of instructions does not satisfy the predefined threshold number of instructions, that the native code segment has a low level of complexity; and
a native code execution module to determine a status of the thread based on the determined level of complexity and execute the native code segment based on the status of the thread, wherein the status of the thread indicates whether the native code segment is to be executed as a native or a managed code segment.

2. The computing device of claim 1, wherein the native code initiation module is further to:
determine whether the native code segment requires registration; and
transmit the native code segment to the binary analysis module in response to a determination that the native code segment requires registration.

3. The computing device of claim 1, wherein the native code initiation module is further to load the native code segment from a shared library.

4. The computing device of claim 1, wherein the binary analysis module is further to map the native code segment to a memory space associated with the thread.

5. The computing device of claim 1, wherein the binary analysis module is further to:
   determine whether loops exist within the native code segment; and
   determine the level of complexity further as a function of whether loops exist within the native code segment.

6. The computing device of claim 1, wherein the binary analysis module is further to:
   determine whether at least one of an indirect control flow and an unidentified opcode exists in the native code segment;
   determine the level of complexity further as a function of whether at least one of an indirect control flow and an unidentified opcode exists in the native code segment.

7. The computing device of claim 1, wherein the binary analysis module is further to generate a complexity indicator that indicates the determined level of complexity.

8. The computing device of claim 7, wherein the native code execution module is further to:
   identify whether the complexity indicator indicates a low level of complexity or a high level of complexity;
   maintain, in response to a determination that the complexity indicator indicates a low level of complexity, the status of the thread to indicate that the native code segment is to be executed as managed code;
   set, in response to a determination that the complexity indicator indicates a high level of complexity, the status of the thread to indicate that the native code segment is to be executed as native code.

9. One or more non-transitory computer-readable storage media comprising a plurality of instructions that, in response to being executed, result in a computing device:
   receiving a call to execute a native code segment from a thread configured to execute a managed code segment;
   performing a binary analysis of the native code segment to determine a number of instructions in the native code segment;
   determining whether the number of instructions satisfies a predefined threshold number of instructions;
   determining, in response to a determination that the number of instructions satisfies the predefined threshold number of instructions, that the native code segment has a high level of complexity;
   determining, in response to a determination that the number of instructions does not satisfy the predefined threshold number of instructions, that the native code segment has a low level of complexity;
   determining a status of the thread based on the determined level of complexity; and
   executing the native code segment based on the status of the thread, wherein the status of the thread indicates whether the native code segment is to be executed as a native or a managed code segment.

10. The one or more non-transitory computer-readable storage media of claim 9, further comprising a plurality of instructions that, in response to being executed, result in the computing device:
    determining whether the native code segment requires registration; and
    performing the binary analysis in response to a determination that the native code segment requires registration.

11. The one or more non-transitory computer-readable storage media of claim 9, further comprising a plurality of instructions that, in response to being executed, result in the computing device loading the native code segment from a shared library.

12. The one or more non-transitory computer-readable storage media of claim 9, further comprising a plurality of instructions that, in response to being executed, result in the computing device mapping the native code segment to a memory space associated with the thread.

13. The one or more non-transitory computer-readable storage media of claim 9, further comprising a plurality of instructions that, in response to being executed, result in the computing device:
    determining whether loops exist within the native code segment; and
    determining the level of complexity further as a function of whether loops exist within the native code segment.

14. The one or more non-transitory computer-readable storage media of claim 9, further comprising a plurality of instructions that, in response to being executed, result in the computing device:
    determining whether at least one of an indirect control flow and an unidentified opcode exists in the native code segment; and
    determining the level of complexity further as a function of whether at least one of an indirect control flow and an unidentified opcode exists in the native code segment.

15. The one or more non-transitory computer-readable storage media of claim 9, further comprising a plurality of instructions that, in response to being executed, result in the computing device:
    generating a complexity indicator that indicates the determined level of complexity;
    identifying whether the complexity indicator indicates a low level of complexity or a high level of complexity; and
    determining the status of the thread further comprises (i) maintaining the status of the thread to indicate that the native code segment is to be executed as managed code, in response to a determination that the complexity indicator indicates a low level of complexity and (ii) setting the status of the thread to indicate that the native code segment is to be executed as native code, in response to a determination that the complexity indicator indicates a high level of complexity.

16. A method for invoking native code from managed code using binary analysis, the method comprising:
    receiving, by a computing device that includes a memory and a processor coupled to the memory, a call to execute a native code segment from a thread configured to execute a managed code segment;
    performing, by the computing device, a binary analysis of the native code segment to determine a number of instructions in the native code segment;
    determining, by the computing device, whether the number of instructions satisfies a predefined threshold number of instructions;
    determining, by the computing device, that the native code segment has a high level of complexity in response to a determination that the number of instructions satisfies the predefined threshold number of instructions;
    determining, by the computing device, that the native code segment has a low level of complexity in response to a determination that the number of instructions does not satisfy the predefined threshold number of instructions;

determining, by the computing device, a status of the thread based on the determined level of complexity; and executing, by the computing device, the native code segment based on the status of the thread, wherein the status of the thread indicates whether the native code segment is to be executed as a native or a managed code segment.

17. The method of claim 16, further comprising:

determining, by the computing device, whether the native code segment requires registration; and performing, by the computing device, the binary analysis in response to a determination that the native code segment requires registration.

18. The method of claim 16, further comprising loading, by the computing device, the native code segment from a shared library.

19. The method of claim 16, further comprising mapping, by the computing device, the native code segment to a memory space associated with the thread.

20. The method of claim 16, further comprising:

determining, by the computing device, whether loops exist within the native code segment; and determining the level of complexity further as a function of whether loops exist within the native code segment.

21. The method of claim 16, further comprising:

determining, by the computing device, whether at least one of an indirect control flow and an unidentified opcode exists in the native code segment; and determining the level of complexity further as a function of whether at least one of an indirect control flow and an unidentified opcode exists in the native code segment.

22. The method of claim 16, further comprising generating, by the computing device, a complexity indicator that indicates the determined level of complexity.

* * * * *